United States Patent [19]
Lee

[11] Patent Number: 5,634,130
[45] Date of Patent: May 27, 1997

[54] METHOD AND APPARATUS FOR SPURIOUS INTERRUPT DETECTION IN A DATA PROCESSING SYSTEM

[75] Inventor: Van H. Lee, Cedar Park, Tex.

[73] Assignee: International Business Machines Corporation, Armonk, N.Y.

[21] Appl. No.: 543,764

[22] Filed: Oct. 16, 1995

Related U.S. Application Data

[63] Continuation of Ser. No. 124,511, Sep. 20, 1993, abandoned.

[51] Int. Cl.$^6$ .................................................. G06F 13/00
[52] U.S. Cl. ........................ 395/733; 395/742; 395/741
[58] Field of Search ................................ 395/733, 741, 395/742

[56] References Cited

U.S. PATENT DOCUMENTS

| | | |
|---|---|---|
| 4,349,873 | 9/1982 | Gunter et al. |
| 4,394,727 | 7/1983 | Hoffman et al. |
| 4,413,317 | 11/1983 | Swenson |
| 4,495,569 | 1/1985 | Kagawa |
| 4,530,091 | 7/1985 | Crockett |
| 4,604,500 | 8/1986 | Brown et al. |
| 4,807,111 | 2/1989 | Cohen et al. |
| 4,862,354 | 8/1989 | Fiacconi et al. |
| 4,914,653 | 4/1990 | Bishop et al. |
| 4,930,070 | 5/1990 | Yonekura et al. |
| 5,109,490 | 4/1992 | Arimilli et al. |

(List continued on next page.)

FOREIGN PATENT DOCUMENTS

| | | |
|---|---|---|
| 57-191758 | 11/1982 | Japan. |
| EP 0263886 A1 | 4/1988 | Japan. |
| 2259161 | 3/1993 | United Kingdom. |
| 93/00638 | 1/1993 | WIPO. |

OTHER PUBLICATIONS

AFIPS Conference Proceedings, National Computer Conference, Jun. 1977, pp. 227–236: "An organization for optical linkages between integrated circuits" —*Lipovski*.

Proceedings of the Supercomputing Conference, Nov. 1989—Conf. No. 2, Institute of Electrical and Electronics Engineers, pp. 466–475 $C^2MP$: A Cache–Coherent, Distributed Memory Multiprocessor-System—*Marquardt et al.*

IBM Technical Disclosure Bulletin, vol. 29, No. 4, Sep. 1986, "Software Architecture for the Support of Multiple Adapters On An Interrupt Level".

(List continued on next page.)

*Primary Examiner*—Jack B. Harvey
*Assistant Examiner*—John Travis
*Attorney, Agent, or Firm*—Volel Emile; Andrew J. Dillon

[57] ABSTRACT

An interrupt mechanism within a data processing system where every expected interrupt has a unique interrupt signature. This interrupt signature is known by the system interrupt handler of the interrupt's particular type, such as external, timer, divide by zero, etc. For example, external interrupt is one type of interrupt, and the FLIH of external interrupt must know the signatures of all expected external interrupts. Every expected interrupt has its signature stored in a plurality of processor general purpose registers. The name of these registers must be known by the interrupt handler that will handle the interrupt. The interrupt handler preserves the processor state when it tries to verify signatures. If a signature match is found, the interrupt handler will branch to the corresponding second level interrupt handler for normal interrupt processing. If the second level interrupt handler is shared by some sources, then the second level interrupt handler must query these sources for the ownership. The lack of an ownership causes the second level interrupt handler to declare the interrupt as spurious. If there is only one source, the second level interrupt handler will handle the interrupt. If an ownership is found among the sources, the routine that was called to establish its ownership will have handled the interrupt: properly. A first level interrupt handler will consider an interrupt as spurious after it has failed verifying the signatures of all expected interrupts of its own type.

15 Claims, 2 Drawing Sheets

U.S. PATENT DOCUMENTS

| | | |
|---|---|---|
| 5,125,093 | 6/1992 | McFarland . |
| 5,138,709 | 8/1992 | Jones et al. . |
| 5,163,146 | 11/1992 | Antanaitis, Jr. et al. ............... 395/550 |
| 5,179,707 | 1/1993 | Piepho . |
| 5,192,882 | 3/1993 | Lipovski . |
| 5,193,187 | 3/1993 | Strout, II et al. . |
| 5,257,378 | 10/1993 | Sideserf et al. ........................ 395/700 |
| 5,257,383 | 10/1993 | Lamb ..................................... 395/725 |
| 5,291,606 | 3/1994 | Okayama et al. ...................... 395/725 |
| 5,291,608 | 3/1994 | Flurry .................................... 395/725 |
| 5,325,510 | 6/1994 | Frazier . |

OTHER PUBLICATIONS

Motorola's "PowerPC 601 RISC Microprocessor User's Manual", MPC601UM/AD., 1993.

M. D. Bowers et al, "Diagnostic Software and Hardware for Critical Real–Time Systems", IEEE Trans. on Nuclear Sci., vol. 36, No. 1, Feb. 1989, pp. 1291–1298.

D. W. Pritty et al, "Instanet—A Real Time Lan Architecture", IEEE Comput. Soc. Press, Issue XVI+470, 1987, pp. 60–63.

S. Muchmore, "Multibus II Message Passing", Microprocessors and Microsystems, vol. 10, No. 2, Mar. 1986, pp. 91–93.

J. B. Rasmussen et al, "Real–time Interrupt Handling in Ada", Software—Practice and Experience, vol. 17(3), Mar. 1987, pp. 197–213.

METHOD AND APPARATUS FOR SPURIOUS INTERRUPT DETECTION IN A DATA PROCESSING SYSTEM

This Application is a continuation of Ser. No. 08/124,511, filed 9/20/93, now abandoned

TECHNICAL FIELD

The invention relates to data processing systems, and more particularly to a method and apparatus for detecting spurious, or unexpected, interrupts in a data processing system.

CROSS REFERENCES TO RELATED APPLICATIONS

Ser. No. 08/124,513, filed September 20, 1993 for METHOD AND APPARATUS FOR SIGNALLING INTERRUPT INFORMATION IN A MULTIPROCESSOR. COMPUTER SYSTEM, currently co-pending and assigned to the same assignee as the present invention, which is hereby incorporated by reference.

Ser. No. 08/124,513, filed Sep. 20, 1993 for SCALABLE SYSTEM INTERRUPT STRUCTURE FOR A MULTI-PROCESSING SYSTEM, currently co-pending, and assigned to the same assignee as the present invention, which is hereby incorporated by reference.

BACKGROUND OF THE INVENTION

In data processing systems, interrupts are used to signal a processor that an interrupt condition exists at a given source. This interrupt source could be, for example, an adapter card on a system bus which requires some type of service. The re,tired service may be to initiate a transfer of data, or to read a status register that has recently changed.

When the processor has been conditioned to accept an interrupt, otherwise known as having the interrupts being enabled, the processor will initiate interrupt processing upon the receipt of an interrupt. This interrupt processing typically involves the processor interrogating the source of the interrupt, performing functions based upon the type of interrupt, and resetting/turning off the interrupt.

At system power-on time, data processing systems typically execute instructions stored in the system's initial-program-load (IPL) read only memory (ROM). This IPL ROM code is relatively primitive in the types of operations that can be performed, and is primarily used to boot-up the system prior to loading and executing the more general purpose operating system software.

Due to the relatively limited intelligence of the IPL ROS code, with the corresponding limited ability to handle the numerous possible combinations of conditions (such as interrupts) that may occur within a system, the bring up of the system at power-on time requires operations to occur in an orderly fashion. To help achieve this objective, many systems are designed such that adapter cards or other sources of interrupts do not generate an interrupt until commanded to do so by the processor. In other words, a routine that is initializing an adapter card may initialize certain registers or internal variables, enable its interrupt processing ability, signal the adapter that is ready to process interrupts, and then wait for the resulting interrupt to be generated by the adapter. These resulting interrupts are thus known as expected interrupts.

During system start-up, before the loaded operating system kernel establishes the system interrupt handlers in RAM, many different type of interrupts may occur. These interrupts can be expected or unexpected/spurious with respect to the interrupt handlers in ROM. A single-thread and non-interrupt driven executing environment of the IPL ROM allows expected interrupts to occur under the control of the IPL ROM code. Most of the time, spurious interrupts are the result of software programming errors.

One attempt to deal with an unused interrupt, which is a particular type of unexpected interrupt, is to treat such unused interrupt as spurious. However, this type of system is lacking in that a valid interrupt may also be spurious in its nature if it is not expected.

There is therefore a need to adequately detect unexpected, spurious interrupts.

SUMMARY OF THE INVENTION

An interrupt mechanism is provided to detect unexpected, or spurious, interrupts in a data processing system. Every expected interrupt has a unique interrupt signature, or bit pattern. This interrupt signature is known by the system interrupt handler for the particular type of interrupt. For example, external interrupt is one type of interrupt, and the system handler of external interrupt must know the signatures of all expected external interrupts. Every expected interrupt has its signature stored in a plurality of processor general purpose registers. The name of these registers must be known by the FLIH who will handle the interrupt (the system handler is normally referred to as the first level interrupt handler, or FLIH). A FLIH preserves the processor state when it tries to verify signatures. If a signature match is found, the FLIH will branch to the corresponding second level interrupt handler (SLIH). The SLIH may also preserve the processor state, and is responsible for returning control to the interrupted routine. If the SLIH is shared by some sources, then the SLIH must query these sources for the ownership. The lack of an ownership causes the SLIH to declare the interrupt as spurious. If there is only one source, the SLIH will handle the interrupt. If an ownership is found among the sources, the device SLIH routine that was called to establish its ownership will have handled the interrupt properly.

A FLIH will consider an interrupt as spurious after it has failed verifying the signatures of all expected interrupts of its own type. The spurious interrupt is then indicated, throughout some operator interface hardware. The occurrence of a spurious interrupt is treated as a fatal error, and will stop the machine.

This mechanism is very effective in catching spurious interrupt, especially after IPL ROM gives control to the loaded kernel code and before the kernel establishes its own interrupt handlers in RAM. During that period of time, the kernel still relies on ROM interrupt handlers to detect spurious interrupts which are most likely an indication of some software programming errors.

It is an object of the present invention to provide an improved data processing system.

It is a further object of the present invention to provide an improved system for processing interrupts in a data processing system.

It is yet another object of the present invention to provide an improved method for detecting spurious interrupts in a data processing system.

These, and other, objects will now be described with reference to the following drawing, in which:

DETAILED DESCRIPTION OF THE PREFERRED EMBODIMENT

Figure 1:
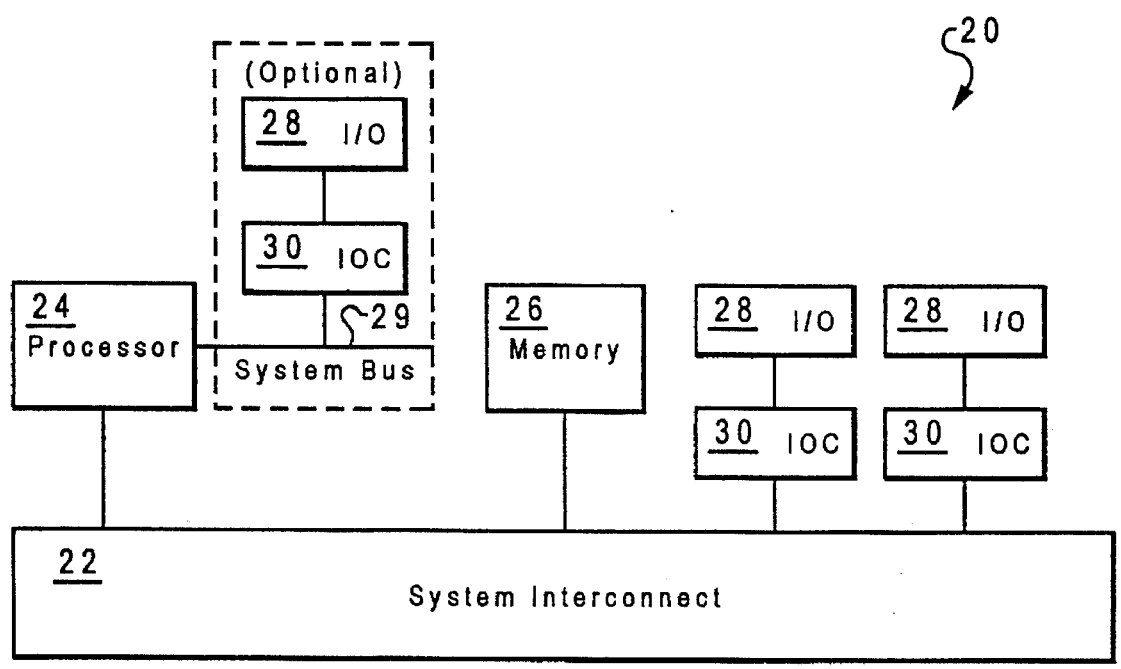
FIG. 1 is a logical view of a data processing system.

FIG. 1 illustrates the logical view of a data processing system 20. The system interconnect 22 allows for the transfer of data among the various components of the system: the processor 24, memory 26, and I/O 28 attached via an Input/Output Controller (IOC) 30 which is directly attached to the system interconnect 22. There may also be optional system bus(es) 29 from the processor to which additional I/O and IOCs are attached. The system interconnect 22 may be one of several different constructs (for example, a System Bus, a switch, etc.) and is system dependent. In the preferred embodiment, the system interconnect is a system bus.

There are numerous sources for interrupts in a data processing system. The processor may have certain "exception" conditions that may cause an internal interrupt. These could include:

(i) Data Storage Interrupt, (ii) Instruction Storage Interrupt, (iii) Program Interrupt (iv) Floating Point Unavailable Interrupt, (v) Timer Interrupt, (vi) Direct Store Error Interrupt (vii) System Call Interrupt, etc.

In addition, interrupts can be generated external to the processor (external interrupts) and which require processor intervention. For example, an IOC 30 could generate an interrupt as requested by I/O 28. Since interrupts (both internal and external) can occur asynchronously, unexpected interrupts have to be identified and handled with the proper action. For all interrupts used by IPL ROM, the proper First Level Interrupt Handlers are provided. Any spurious interrupts, including those not used by IPL ROM, will invoke an error handling routine. Expected interrupts must come from assembly language routines, due to a requirement for specific register manipulation without compiler intervention. Therefore, C language routines will call the proper assembly routines when they use or expect an interrupt. The following rules are established for the assembly language routines who expect an interrupt to occur:

The assembly language routines must save registers whose contents are expected by the caller to be preserved.

If the assembly language routine is called from a C-routine, general purpose register R3 must be passed with the IPL control block address. This is passed from the C-routine to the assembler routine as the first parameter/argument of the function call (the C-routines expecting an interrupt normally have a copy of the IPL control block address).

Each assembly routine selects two general registers of its choice to store its own signature.

All signatures must be unique regardless the registers containing them and the type of interrupt to be expected by the assembly language routines.

The signature must be set up prior to expecting the interrupt.

There are two possible return codes. One return code indicates the expected interrupt did occur, and the other indicates the expected interrupt never occurred (possibly within a time-out period).

The general program flow of any First Level Interrupt Handler (FLIH) conform to the following rules:

Each FLIH must know all the possible signatures used by all routines expecting the interrupt type to be serviced by this FLIH. This includes knowing the signature patterns and the register-pair storing them.

Each FLIH must use Condition Register field CR5 for conditional compare-instructions and branch-instructions. The FLIH must not modify anything except CR5 and the signature register-pair when. there is a match. The preferred embodiment has a 32-bit condition register, divided into 8 4-bit fields known at CR0, CR1 ... CR7. Condition register field CR5 is reserved for system code. According to the C-compiler linkage convention, compiled C-code will not use CR5. By avoiding use of CR5 in assembly language routines, it is thus alright to destroy CR5 during interrupt processing by the IPL ROM. Therefore, two cases can occur: (1) interrupts occur when IPL ROM is still in control—no problem to normal execution of IPL ROM code as CR5 not used by C or assembly language routines; or (2) interrupts occur after loaded system code is in control: IPL ROM handlers will intercept the interrupt as spurious interrupts, and system will halt execution anyway (i.e. the destruction of the value in CR5 is of no consequence).

Each FLIH checks for each possible signature by XOR-ing its register pair with the signature pattern. If there is a match, i.e. the register-pair becomes all zero, the corresponding Second Level Interrupt Handler is given control. Otherwise, the register-pair is restored by XOR-ing with the same signature pattern.

Each FLIH must exhaust its set of signatures before considering the interrupt as spurious, and giving control to the error handling routine. In the preferred embodiment, spurious interrupts cause the processor to stop normal execution, and enter a diagnostic state. The only way to get out of this diagnostic state is to turn off and then turn on the machine.

All FLIHs are only responsible for directing the interrupt servicing to the proper SLIH. They are not responsible for resuming the interrupted program.

Second Level Interrupt Handlers (SLIH) are routines actually servicing the interrupt. However, these routines are very specific for a given interrupt. No general rules are required for the purposes of the present invention.

Figure 2:
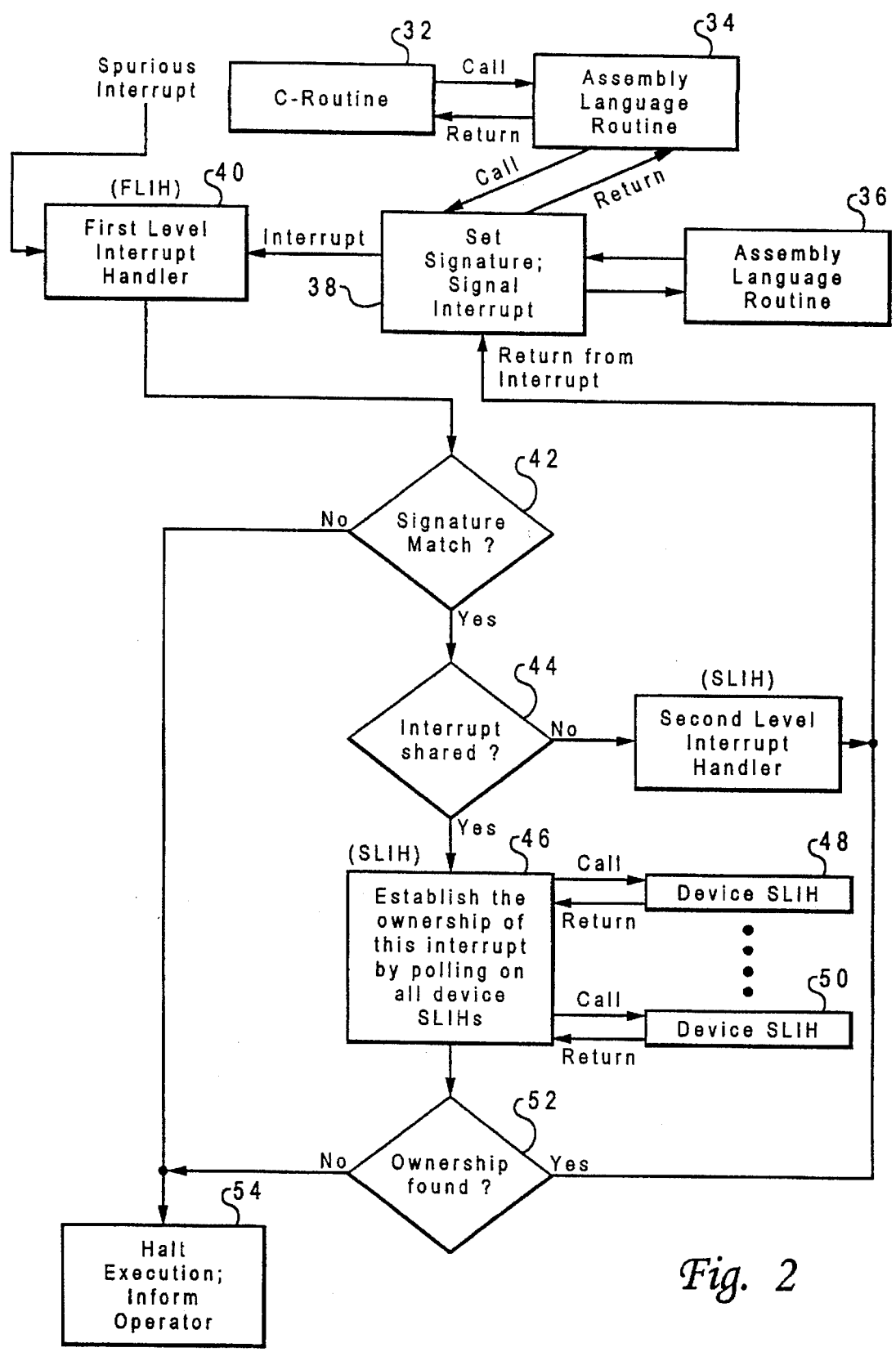
FIG. 2 is a flow diagram showing the first and second level interrupt handler processing.

FIG. 2 is a logic flow diagram which depicts the above described system. Expected interrupts must come from assembly language routines such as 34 or 36, due to a requirement for specific register manipulation without compiler intervention. Therefore, C language routines 32 call the proper assembly routine(s) 34 when they use or expect an interrupt. Alternatively, an assembler language routine 36, without having a C language counterpart, could directly invoke block 38 to initiate the signalling/enabling of an interrupt. The assembly language routine 34 saves registers whose contents are expected by the caller to be preserved. If the assembly routine is called from a C-routine at 34, general purpose register R3 is passed to block 38 with the IPL control block address. The IPL control block is an area in RAM to be used by SLIHs for preserving registers. The IPL control block is available when the C-environment, i.e. C run-time stack, has been set up by the IPL ROM. Each assembly routine 34, 36 selects two general registers of its choice to store its own signature. All signatures are unique regardless of the registers containing them and the type of interrupt to be expected by the assembly language routines. The signature is set up at 38, prior to expecting the interrupt. Setting up the signature entails the endorsement of the interrupt to be an expected interrupt within this routine 38. Without setting up the signature, the FLIH will fail to recognize this as being a valid interrupt. Setting up the signature means that the signature pattern is stored in the selected registers. After signature setup, the interrupt is then signalled at 38, indicating that an interrupt is now expected. This signalling of the interrupt causes an IOC to present the expected interrupt through the system interconnect 22 to processor 24. The detection of this generated interrupt by the data processing system causes processor execution to begin executing the First Level Interrupt Handler 40, using traditional techniques of branching to a particular memory location based upon the type of interrupt detected.

The general program flow of any First Level Interrupt Handler (FLIH) 40 is now described. Each FLIH knows all the possible signatures used by all routines expecting the interrupt type to be serviced by this FLIH. This includes knowing the signature patterns and the register-pair storing them (Under IPL ROM, only a limited number of adapters and devices are supported. IPL ROM code, as a whole, is a program which is designed to perform an initial program load using the supported devices and adapters. Therefore, other IPL ROM developers communicate to the developer who is responsible for writing any FLIH that their routines will use/expect an interrupt, that their routines will use what general purpose registers for their interrupt signatures, and that their interrupt signatures are certain specific patterns. The uniqueness of the signatures are resolved among IPL ROM developers before FLIH coding begins). Each FLIH uses Condition Register field CR5 for conditional compare-instructions and branch-instructions. The FLIH does not modify anything except CR5 and the signature register-pair when there is a match. To validate an interrupt signature, the FLIH checks each possible valid signature at 42 by XOR-ing its register pair with the signature pattern as immediate operands. For example, assume the signature pattern stored in R6 and R7 is as follows:

R6=0x53435349 and R7=0x5F494E54

The following code sequence would check the signature:

| | | |
|---|---|---|
| XORIS | R6, R6, 0 × 5343 | |
| XORI | R6, R6, 0 × 5349 | |
| XORIS | R7, R7, 0 × 5F49 | |
| XORI | R7, R7, 0 × 4E54 | |

At the end of this code being executed, if R6 and R7 are both zero, then a signature match has been found. If there is a match (block 42), i.e. the register-pair becomes all zero and there is no shared interrupt (block 44), the corresponding Second Level Interrupt Handler 45 is given control. Otherwise, the register-pair is restored by XOR-ing with the same signature pattern.

Block 46 is the SLIH for an interrupt that is shared among several devices/sources. In this block, the ownership of the interrupt is established by polling all the device SLIHs to check for ownership of the interrupt. Blocks 48, 50 are the individual device SLIHs. Each of the device SLIHs is responsible for identifying whether the interrupt is owned by its device. If so, then the device SLIH will handle the interrupt, and return a x'0' to block 46. Otherwise, the device SLIH returns a x'1' to block 46. As soon as a device SLIH claims the ownership of the interrupt, the polling loop within block 46 is aborted. However, since it is possible that no device SLIH claims the interrupt when block 46 polls all the device SLIHs 4.8, 50. Therefore, a check is made at block 52 to determine whether a return should be made back to the interrupt routine 38 (i.e. one of the device SLIH's returned a x'0'), or halt execution and inform the operator at 54.

All FLIHs are only responsible for directing the interrupt servicing to the proper SLIH. They are not responsible for resuming the interrupted program. The SLIH routines service the interrupt and return control to block 38 (which then returns control to the applicable C or assembly language routine).

Each FLIH must exhaust its set of signatures at 42 before considering the interrupt as spurious, and giving control to the error handling routine at 54. In the preferred embodiment, spurious interrupts cause the processor to stop normal execution, and enter a diagnostic state. The only way to get out of this diagnostic state is to turn off and then turn on the machine.

There are two possible return codes when a return from interrupt returns control to block 38. One return code indicates the expected interrupt did occur, and the other indicates the expected interrupt never occurred (possibly within a time-out period). If an interrupt has occurred as expected, the SLIH will set R0=0. R0 was initially set to x'FF' in block 38 prior to signalling the interrupt, and is dedicated for this differentiation between interrupt occurrence and interrupt time.-out. Upon block 38 regaining control after a return from interrupt, R0 is checked. If R0=0, then it is known that an interrupt occurred due to SLIH processing and modification of the R0 register. If R0=x FF, then it is known that a timeout condition occurred (i.e. the initial value of x'FF' has not been changed by an SLIH).

An example will now be shown for handling external interrupts. Under the PowerPC[1] I/O architecture, external interrupt presentation is controlled by the priority level specifying in the CPPR register. An interrupt with priority level more favorable than that in CPPR will be presented to the processor when the interrupt enable bit=1, meaning that the processor will allow the interrupt request input signal from the processor input pin to be sampled internally for a possible interrupt request. Each processor has a memory-mapped interrupt management area to implement the following interrupt registers:

XIRR0
XIRR4
DSIER
MFRR

[1](™) PowerPC is a trademark of IBM Corporation

The XIRR 0 and XIRR 4 registers contain the interrupt source, i.e. which IOC the interrupt is coming from, and what interrupt level is present from that IOC. The CPPR register is the most significant byte of the respective XIRR register. The XIRR0 register is read only, and the XIRR4 register is read/write, as further described in previously incorporated co-pending application Ser. No. 08/124,182. Reading XIRR4 will return the current content of XIRR4 and set itself to 0xPP000000, where PP is the priority level of the incoming interrupt. Writing XIRR4 will use the data supplied with the write command for specifying the information of the IOC source and level, in order to send an end of interrupt command to the specified IOC.

The DSIER register captures the error code on any input/output access that results in a Direct Store Error interrupt.

The MFRR register implements a software generated interrupt when its value is considered to be higher priority than CPPR, which is the most significant byte of XIRR.

The IPL ROM enforces that one and only one adapter can raise external interrupt at any particular time. This enforcement allows interrupts associated with all I/O adapters to have same priority with respect to the system interrupt logic.

When initializing the I/O Controller, all XIVRs will be set to priority level 1, and directed to the same processor queue, as further described in previously incorporated co-pending application Ser. No. 08/124,182. The CPPR register is set to priority 1 as well. The IPL ROM provides routines to do the following tasks:

void init_ext$_{13}$ int (uint buid, uint level)
  init_ext_int= will set the Interrupt Enable Register (IER) with only the request level enabled. It also writes 0 to the XIVR of the requested level. The parameter buid identifies the controller where these registers are residing.

uint enable_ext_int(IPL_CB_PTRipl_cb_ptr, uint timeout, uint, level)
  enable_ext_int() will set R0 to −1 and then turns on MSR(EE) to allow processor to take external interrupt. It polls the R0 until it is 0 or the polling timeout interval expires. If R0 is 0 before the timeout interval expires, it resets MSR(EE). The value of R0 will then decide if an interrupt occurred or a timeout is detected (A SLIH will set R0 to 0 if an interrupt is taken by the processor).

void disable_ext_int (uintbuid)
  disable_ext_int() will read the content of the XIRR0 to obtain the interrupt source, which consists of the BUID and the level. This data is used to disable the interrupt level within the identified BUID, and reset the priority of that interrupt level to 1.

void reset_ext_int(uintbui)
  reset_ext_int() reads the content of XIRR4 and uses this value to write it back to the same register. This will send an end of interrupt command to the current source of interrupt.

To present an interrupt to the processor, two steps are needed:

a) Call init_ext_int(buid, level).

b) Call enable_ext_int(ipl_cb_ptr, timeout, 0).

When the external interrupt FLIH matches the signature of the enable_ext_int routine, it gives control to the C-external-interrupt SLIH. This SLIH does the following:

a) Use R3 as IPL control block pointer to save all general purpose fixed-point registers.

b) Use general registers to save special registers including Link Register (LR), Counter Register (CTR), Condition Register (CR), Fixed-Point Exception Register (XER), and Multiply-Quotient Register (MQ).

c) Call actual individual handlers from the list of device interrupt routines. If a device interrupt routine acknowledges the ownership of the interrupt, it will return code 0. Otherwise, it returns 1.

d) If no device interrupt routine takes ownership of the interrupt, the flashing 888 error handling routine is invoked.

The following is example code for enabling and processing an external interrupt. Other types of interrupts would be enabled and processed in a similar fashion.

```
uint my_code( IPL_CB_PTR ipl_cb_ptr )
{
    uint buid,level;
    uint how_long;
    uint rc:
    /* my other codes here */
    /* : */
    /* : */
    /* what BUID my adapter resides */
    buid = where_am_i( );
    /* what interrupt level assigned to my adapter */
    level = what_is_my_irq( );
    /* Now my adapter needs to use external interrupt */
    init_ext_int( buid, level );
    /* Kick off the interrupt within "how_long" seconds */
    how _long = Two_SECOND;
    rc = enable_ext_int( ipl_cb_ptr, how_long, 0 );
    if( rc == 0 )
    { /* interrupt did occur */
        /* Do my normal work here */
        /* : */
        /* : */
    }
    else
    { /* a time_out is detected */
        /* Clean up my mess */
        disable_ext_int( buid );
        /* Do my unexpected work */
        /* : */
        /* : */
    }
    /* my other codes here */
    /* : */
    /* : */
}
uint my_slih( IPL_CB_PTA ipl_cb_ptr )
{
    uint buid;
    uint rc = −1;
    if( My_SPAD.expected_interrupt_flag == 1 )
    {
        /* get my adapter's buid from My_SPAD structure */
        buid = My_SPAD.my_buid;
        /* disable further interrupt from my adapter */
        disable_ext_int( buid );
        /* Quiet my adapter from generating further */
        /* interrupt by read/reset status register */
        /* : */
        /* : */
        /* send EOI to reset interrupt controller */
        /* and my adapter for next usage */
        reset_ext_int( buid );
        rc = 0;
    }
    return(rc );
}
```

The following is example code for external interrupt FLIH checking of signature in block 42 of FIG. 2, where R6=0×12345678 and R7=0×9ABCDEF0:

```
ext_int_flih:    xoris    R6, R6, 0 × 1234
                 xori     R6, R6, 0 × 5678
                 cmpi     CR5, 0, R6, 0
                 bne      CR5, not_me
                 xoris    R7, R7, 0 × 9ABC
                 xori     R7, R7, 0 × DEF0
                 cmpi     CR5, 0, R7, 0
                 beq      CR5, is_me
                 xoris    R7, R7, 0 × 9ABC
                 xori     R7, R7, 0 × DEF0
not_me:          xoris    R6, R6, 0 × 1234
                 xori     R6. R6, 0 × 5678
                 b        spurious_ext_int
is_me:           .        /* continue with FIG. 2 */
                 .        /* block 44 processing */
                 .
```

```
                rfi       /* return to block 38 */
spuriour_ext_int:  .      /* continue with FIG. 2 */
                   .      /* block 54 processing */
                hlt
```

In summary, the above described invention allows for easy detection of unexpected, or spurious, interrupts in a data processing system. While the invention has been shown and described with reference to particular embodiments thereof, it will be understood by those skilled in the art that the foregoing and other changes in form and detail may be made therein without departing from the spirit and scope of the invention. For example, as an alternate embodiment to the IPL ROM code embodying the above described code, any type of computer memory could be used to the above described IPL code, such as random-access memory (RAM), diskette, disk, tape or any other type of volatile or non-volatile computer compatible memory.

I claim:

1. A method for detecting spurious interrupts in a data processing system, comprising:
    storing an interrupt signature for an expected interrupt;
    enabling interrupts by said data processing system;
    invoking a first level interrupt handler to validate said stored interrupt signature upon receipt of an interrupt by said data processing system;
    upon validation by said first level interrupt handler, invoking a single specific second level interrupt handler for validating said stored interrupt signature for any one of a plurality of interrupt sources shared by said single specific second level interrupt handler; and
    returning said first level interrupt handler to validation of a subsequent interrupt following invocation of said single specific second level interrupt handler.

2. The method of claim 1 wherein said step of validating further comprises comparing said stored interrupt signature against at least one valid signature to determine if signature match or mismatch.

3. The method of claim 2 wherein said interrupt is rejected as spurious if signature mismatch.

4. The method of claim 2 wherein said interrupt is processed if signature match.

5. The method of claim 2 wherein said plurality of valid signatures is maintained in a memory comprising initial program load instructions.

6. The method of claim 1 wherein said interrupt signature is stored in a pair of registers.

7. The method of claim 1 wherein said interrupt signature corresponds to a particular type of interrupt that is expected.

8. A system for detecting spurious interrupts in a data processing system, comprising:
    means for storing an interrupt signature for an expected interrupt;
    means for enabling interrupts by said data processing system;
    a first interrupt handler that validates said stored interrupt signature upon receipt of an interrupt by said data processing system and invokes a single specific second level interrupt handler in response thereto;
    a single specific second level interrupt handler that validates said stored interrupt signature upon validation by said first LEVEL interrupt handler for any one of a plurality of interrupt sources shared by said single specific second level interrupt handler; and
    means for returning said first level interrupt handler to validation of a subsequent interrupt following invocation of said single specific second level interrupt handler.

9. The system of claim 8 wherein said means for validating comprises means for comparing said stored interrupt signature against at least one valid signature to determine if signature match or mismatch.

10. The system of claim 9 further comprising means for rejecting said interrupt as spurious if signature mismatch.

11. The system of claim 9 further comprising means for processing said interrupt if signature match.

12. The system of claim 9 further comprising means for maintaining said plurality of valid signatures in a memory comprising initial program load instructions.

13. The system of claim 8 further comprising means for storing said interrupt signature in a pair of registers.

14. The system of claim 8 wherein said interrupt signature corresponds to a particular type of interrupt that is expected.

15. A computer program residing in a computer memory having means for detecting spurious interrupts in a data processing system, comprising:
    means for storing an interrupt signature for an expected interrupt;
    means for enabling interrupts by said data processing system;
    a first interrupt handler that validates said stored interrupt signature upon receipt of an interrupt by said data processing system and invoke a single specific second level interrupt handler in response thereto;
    a single specific second level interrupt handler that validates said stored interrupt signature upon validation by said first level interrupt handler for any one of a plurality of interrupt sources shared by said single specific second level interrupt handler; and
    means for returning said first level interrupt handler to validation of a subsequent interrupt following invocation of said single specific second level interrupt handler.

* * * * *